May 20, 1958  C. J. MOEN  2,835,735
ANTI-SHOCK TRANSDUCER
Filed Dec. 4, 1953  2 Sheets-Sheet 1

INVENTOR.
CARL J. MOEN
BY Eugene L. Knoblock
ATTORNEY

May 20, 1958 C. J. MOEN 2,835,735
ANTI-SHOCK TRANSDUCER
Filed Dec. 4, 1953 2 Sheets-Sheet 2

INVENTOR.
CARL J. MOEN
BY
Eugene M. Knoblock
ATTORNEY

United States Patent Office 2,835,735
Patented May 20, 1958

2,835,735

ANTI-SHOCK TRANSDUCER

Carl J. Moen, Buchanan, Mich., assignor to Electro Voice, Inc., Buchanan, Mich., a corporation of Indiana Application December 4, 1953, Serial No. 396,290

11 Claims. (Cl. 179—1)

This invention relates to an anti-shock transducer. The invention may be applied to microphones which are used in air or to underwater microphones or hydrophones.

The purpose of a transducer is to produce an electrical signal which is a faithful reproduction of a sound signal which reaches it. Extraneous electrical signals within the audible frequency range which are produced by the transducer will be reproduced by a loud speaker as unwanted sound superimposed upon the sound to which the transducer was intentionally subjected. Such extraneous electrical signals are obviously undesirable and may be generated by the action of the transducer when it is jarred or accelerated, or when vibrations are transmitted thereto through its mechanical parts, such as its housing and the support for the vibration sensitive elements of the transducer.

It is common practice in the manufacture of transducers to attenuate disturbing mechanical signals by mechanical cushioning means, commonly referred to as shock mountings. Such cushioning means may take various forms, such as the use of rubber, felt or other yielding material, so located as to reduce the transmission of mechanical vibrations through the transducer structure and between the various parts thereof. Such cushioning means are essentially passive in nature and merely serve to reduce or change the form of a mechanical signal before it reaches the sensitive element of the transducer. The effectiveness of such cushioning means is limited, however, and where efforts are made to achieve a sufficient or effective degree of isolation of the sensitive element of the transducer from vibrations of mechanical origin, the mountings or cushions required are found to be unwieldy and which tend to be unstable.

The primary object of this invention is to produce an anti-shock transducer in which reliance upon cushioning means to damp mechanical vibrations is reduced to a minimum, and in which electrical means are employed whereby an electrical signal equal in magnitude to that resulting from mechanical vibration of the microphone transducer is generated and connected in opposite polarity to the transducer for cancellation of the unwanted component of the signal generated by the transducer.

A further object is to produce a device of this character having two juxtaposed transducer units, of which one is responsive to sound signals and to mechanical vibrations, and the response of the other is substantially limited to mechanical vibrations, wherein said transducers are electrically connected with their outputs in opposite polarity.

A further object is to provide a device of this character having two substantially similar transducer units mounted adjacent each other in a common housing, having means for completely shielding one of said transducers from sound signals and wherein both transducer units respond substantially to signals of mechanical origin and are connected together in phase opposition.

A further object is to provide a device of this character having two transducer units carried by a common mounting, in which one thereof is shielded from sound signals and in which the sensitive transducer elements have substantially equal resonant frequencies and also have properties resulting in substantially equal quotients of mass divided by resistance.

A further object is to provide a device of this character having two transducer units mounted in a common housing and connected in phase opposition, with one transducer unit being sensitive only to vibrations of mechanical origin, wherein electrical means are employed to compensate for inequalities in sensitivity of the two microphone units.

Other objects will be apparent from the following specification.

Figure 1:
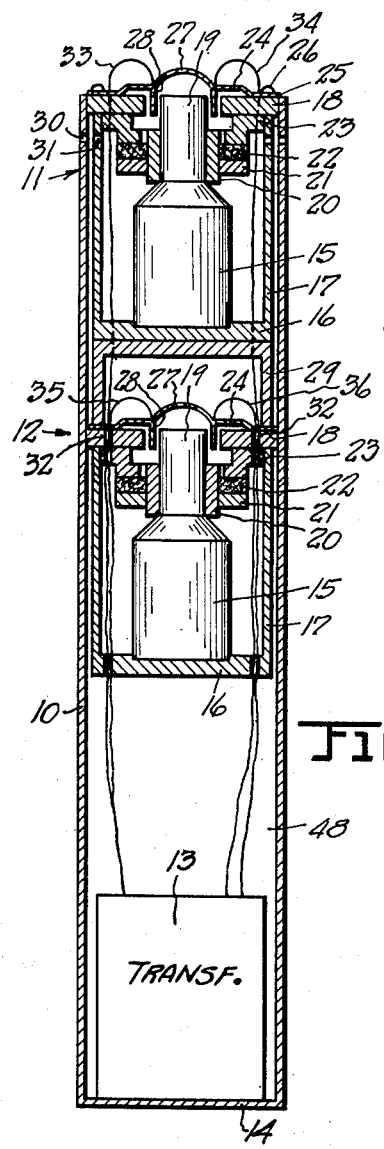
Fig. 1 is an axial sectional view of a transducer embodying my invention employing transducer elements of the dynamic or moving coil type.
Figure 3:
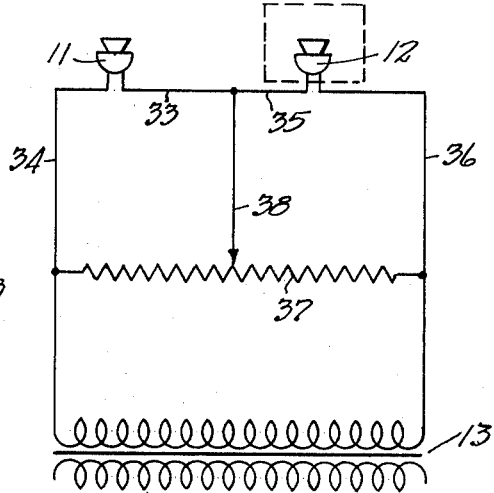
Fig. 3 is a wiring diagram illustrating one electrical connection of the components of the device embodying my invention.
Figure 4:
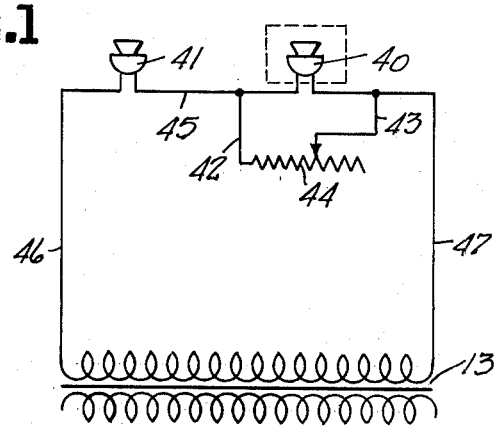
Fig. 4 is a wiring diagram of a modified electrical circuit usable in my invention.

Referring to the drawings, and particularly to Figs. 1, 3 and 4, which illustrate one embodiment of the invention employing transducers of the so-called "dynamic" type, the numeral 10 designates an elongated housing which is preferably formed of non-ferro-magnetic metal or other non-magnetic material. This housing mounts a "dynamic" transducer unit 11 in one end portion thereof, a second transducer 12 interiorly thereof, and also mounts the usual electrical component, such as transformer 13, interiorly thereof. The inner end 14 of the housing 10 is closed, and the housing is so constructed that only the outer transducer 11 is responsive to sound signals. It will be understood that this construction is intended for operation by airborne signals and that, in the event a hydrophone is employed, suitable arrangements will be made to similarly render only one transducer 11 sensitive to underwater sound.

The transducers 11 and 12 are substantially similar, and similar numerals will be employed in referring to the parts of each. Each transducer has a permanent magnet 15 carried by a soft iron frame or housing having a base portion 16 at which the permanent magnet is secured, and having a substantially cylindrical frame portion 17. An annular soft iron member 18 is carried by the free end of the cylinder 17 and encircles the tip of a soft iron core member 19 carried by the permanent magnet 15 and projecting therefrom and through the opening in the annular member 18. A sleeve 20 of nonferro magnetic material, such as brass, slidably encircles the member 19 and has an apertured flange 23 at its upper end located in centered relation to the parts 15 and 18. Thus, the sleeve 20, 23 serves to position parts 18 and 19 in accurate concentric relation. The sleeve 20 is exteriorly screw-threaded and mounts a non-magnetic nut 21. A fibrous ring 22 encircles the sleeve 20 and engages the nut 21 and the apertured sleeve and flange 23. The ring 22 is formed of felt or other compliant compressible material serving to provide acoustical damping and is compressed to desired amount by the nut 21 to provide the desired damping of air passing through said ring and the apertures of flange 23.

A diaphragm 24 has its marginal portion 25 secured to the annular member 18 by screws 26, or glue, or other securing means and is offset into spaced relation to said ring 18 inwardly of the part 25, said diaphragm preferably having a part-spherical or domed central portion 27 of a diameter preferably at least equal to the diameter of the adjacent or top portion of the member 19 and less than the inner diameter of the ring 18. A voice coil 28 is carried by the diaphragm at the outer margin of its central portion 27 and projects into the annular space between the parts 18 and 19.

A spacer member 29 is interposed between the adjacent ends of the transducers 11 and 12, bearing at one end against the base 16 of the outer transducer, and at its opposite end against the annular member 18 of the inner transducer. This spacer will preferably have clearance with the tubular housing wall 10 comparable with the spacing of the cylindrical wall 17 of each transducer with said tubular housing wall. A plurality of apertures 30 are formed in the tubular housing 10 adjacent the member 18 usually of transducer 11 only, and a plurality of apertures 31 are formed in the cylindrical part 17 adjacent the apertures 30 of transducer 11. Where the apertures 30 and 31 are employed, they are so oriented with reference to the outer transducer and its diaphragm as to render the outer transducer bi-directional. Another characteristic of the construction is that apertures 32 are formed in the member 18 of the transducer 12, and similar registering apertures are formed in flange 23 to provide a low impedance air pass from front to back of the diaphragm of the transducer 12. These apertures are employed with both pressure-gradient and pressure transducers, i. e., with transducers omitting apertures 30, 31, as well as with transducers as here shown with such apertures 30, 31.

The electrical components are shown schematically and comprise leads 33 and 34 connected with the voice coil of the transducer 11, and leads 35 and 36 connected with the coil 28 of the inner transducer 12. These leads extend to electrical components of the microphone. Such components may be arranged as illustrated in Fig. 3, wherein the leads 34 and 36 have a resistance 37 connected thereacross, and the leads 33 and 35 are connected together and to a common lead 38 associated with a slider adapted to traverse the resistance 37. The leads 34 and 36 extend to the transformer 13. This electrical connection is particularly well suited to constructions wherein the two transducers are nearly similar, and it will be understood that the connection is such that the phases of the two microphones are electrically in opposition so that the output of the transducer 12 cancels that part of the output of the transducer 11 which results from mechanical vibration of the transducer, thereby leaving only that portion of the output of the transducer 11 which is produced by sound signals.

Another manner of connecting the two transducers eletrically which is usable in cases where the two transducers are not substantially similar, and particularly where one transducer is more sensitive than the other, is illustrated in Fig. 4. In this connection, transducer 40 is more sensitive than transducer 41, and transducer 40 has connected in shunt relation therewith through leads 42 and 43 a variable resistor 44. The two transducers 41 and 40 are connected by a lead 45, and leads 46 and 47 extend from the respective microphones to the transformer for delivery of the output of the two microphones.

The embodiment of the invention in a dynamic microphone, while illustrated in association with microphones of the pressure gradient or bi-directional type, is also suitable for use in association with dynamic microphones of the pressure type. In the latter instance the holes 30 and 31 are eliminated and a low impedance path from the back of the diaphragm of the transducer 11 to the large volume of the chamber portion at 48 behind the transducer 12 will be provided. Another characteristic of the application of the invention to a microphone of the pressure type will be to tighten up the damping provided by the felt members 22 so as to render the two transducers resistance controlled rather than mass controlled as is true in the case of most types of bi-directional microphones.

In considering the dynamic type of microphone illustrated in Fig. 1, it will be observed that the spacer member 29 forms a cup or a hood which bears against the member 18 of the transducer 12 around the diphragm 24 thereof in such a manner that it acts in cooperation with the housing 10 to shield the diaphragm of the second transducer 12 against sound signals. In this case, since the unit is a microphone, the shielding occurs against sound signals borne by air. On the other hand, the diaphragm 24 of the transducer 11 is open to impingement by sound signals. Consequently, there is a basic difference in the response of the two microphones in that transducer 11 is responsive to sound signals, whereas transducer 12 is isolated completely, or substantially completely, from sound signals. In addition the two transducers are mounted in the housing 10 in substantially similar manner and with substantially equal response to vibrations of a purely mechanical nature transmitted through the housing as a result of jarring, impact, acceleration and the like. The outputs of the two microphones or transducers being connected in canceling relation, the latter components are canceled out and the residual signal response of the unit is the response to the intended sound signal only.

It will be apparent as a result of such canceling action that the use of sound deadening or damping material, such as shock mountings, is not critical or important in this microphone as long as the response of the two transducer units 11 and 12 to mechanical vibration is substantially the same type of mounting as the other. Even as to this point, however, it will be apparent that, through electrical compensation, considerable difference in the response characteristics of the two transducer units may be adequately compensated. One characteristic of this microphone construction, however, is that the provision of a second transducer introduces an extra impedance in the microphone circuit, with the result that a slight loss in sensitivity may occur. By test it has been found that this loss of sensitivity may be in the order of three decibels in a transducer using dynamic elements of a bi-directional or pressure gradient type where the electrical impedances of the two transducers are substantially equal and the mechanical-electrical transducing efficiencies are substantially equal. It will be understood that this loss is cited as illustrative and will vary in different installations where the conditions of the system vary from those described as producing the three decibel loss of sensitivity.

It will be understood that the arrangement of the parts and the shape of the housing 10 may vary as conditions require or as design characteristics may dictate. In general, the stationary parts of each of the two transducers are attached rigidly to each other through a housing and the sensitive or moving portions of the two transducers should be located as close to each other as convenient. The aim in each instance will be to provide both of the moving or sensitive elements with environments which will cause them to respond equally or substantially identically to disturbances of a mechanical nature which may result from jarring or impact of the housing. Obviously this can be accomplished by an arrangement of the two units side by side or in other relations differing from the end-to-end relation shown in Fig. 1. Insofar as the electrical connections are concerned, the important feature is that the connections be made in opposite phasing with respect to the outputs of the two transducers. This can be accomplished by either parallel or series opposing connections. The choice as between parallel and series connections is largely dependent upon electrical impedance values.

The housing 10 and the hood 29 will be formed of rigid material so that they are not sensitive to or vibrated in response to ordinary vibrations constituting sound signals in the audio frequency range. The rigidity of this container results in substantially complete shielding of the second transducer 12. As a result of this condition the extreme mismatch of acoustical impedances in traversing the air-solid and the solid-air interfaces provides almost perfect isolation of the secondary transducer 12 from the sound medium. This arrangement insures that the second transducer will respond only and substantially equally to mechanical signals transmitted thereto through the housing 10.

In considering the response characteristics of the microphone or transducer, relative positions of the two transducers 11 and 12 are selected with a view toward combining with close proximity thereof a relative position thereof to produce therein signals of nearly equal quality and value for that type of mechanical disturbance which is most troublesome and whose exclusion is most important. In general it has been found that substantially equal response of the two transducers to all types of mechanical disturbances requires that the two transducer moving elements should have substantially equal resonant frequencies and substantially equal quotients of mass divided by mechanical resistance.

It will be understood that the terms "mass," "compliance" and "resistance," as used here, relate to the total effective mechanical values commonly considered with those terms and include the contributions of both acoustical and electrical properties after conversion from acoustical and electrical to equivalent or analogous mechanical units.

An additional characteristic which improves the response of the transducer and which is convenient for use because of that fact, is a characteristic in which the two elements or transducers possess substantially equal transducer sensitivity. This is not a critical matter, however, inasmuch as compensation for inequalities in sensitivity may be made by the use of simple electrical devices, such as voltage dividers and Wheatstone bridge circuit connections. Furthermore, the important characteristic of this device is that substantial equality of output resulting from shock shall be secured, and hence any dissimilar transducers at 11 and 12 whose output resulting from shock substantially cancels in this device, may be used.

Figure 2:
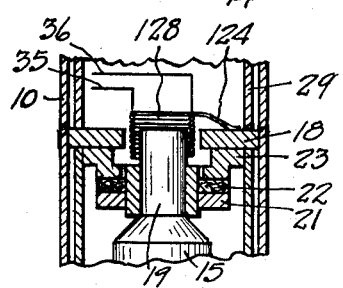
Fig. 2 is a fragmentary sectional view illustrating a modification of the embodiment of the invention shown in Fig. 1.

In the usual construction, the acoustical shielding of the secondary transducer 12 will be required for proper operation of the device. It may be convenient, however, in some instances to eliminate the use of such acoustical shielding and that can be accomplished in cases where the secondary transducer is of a type which has no appreciable diaphragm and has negligible area exposed to the air or other sound transmitting or bearing medium. Such conditions naturally require that the diaphragm or mounting for the sensitive element of the secondary transducer shall be of much smaller area than the diaphragm of the sound responsive transducer and also require that the effective front-to-back distance in the secondary transducer must be small. An example of a construction of this type is shown in Fig. 2 in connection with a dynamic type of secondary transducer, wherein the voice coil 128 thereof is mounted by a compliant support of small area, such as a wire spring 124 formed of non-ferro-magnetic metal. Such a spring is shown as illustrative, and it will be understood that the support may be formed of other materials as long as it is characterized by a small area and by the same ratios of mass to resistance and resonant frequencies as in the Fig. 1 embodiment. It is possible, in the Fig. 2 construction, to leave coil 128 and spring 124 open to atmosphere, instead of being shielded as in Fig. 1.

In constructing such a device, care must be taken, in addition to matching the two transducer elements in other respects, to provide a controllable resistance in association with the secondary transducer since the customary "acoustical" damping of a transducer could not be readily employed with a secondary transducer of such construction. Because of these difficulties, the most convenient version of this microphone will be one in which the two transducers are substantially identical as to their principal components, and in which the acoustical shielding will be employed. Among the reasons for preference of this character are the fact that manufacturing procedures are simplified, extra manufacturing tools are avoided, testing standards can be unified, and sensitivity balance adjustment usually can be omitted.

Figure 5:
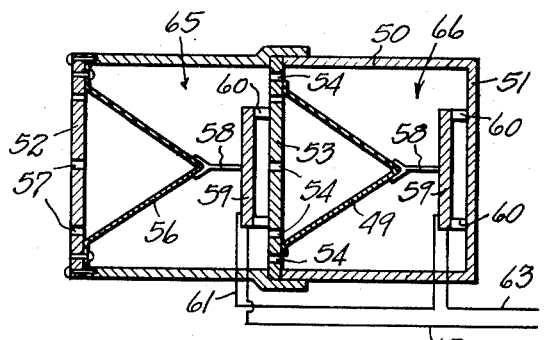
Fig. 5 is an axial sectional view illustrating another embodiment of this invention employing transducer units of the piezoelectric ceramic type.

The invention is not limited in application to transducers of the "dynamic" type. Thus Fig. 5 illustrates the application of the invention to a transducer of the piezoelectric type. In this embodiment of the invention, a housing is formed to provide a tubular portion 50 which is substantially imperforate, an imperforate end portion 51, and a perforate end portion 52. The housing may be formed of two parts as shown, or of a single part, and in either event will have a partition 53 formed substantially centrally and extending transversely thereof. A plurality of apertures 54 will be formed in the partition 53.

Two transducers are provided, the transducer 65 being housed within the chamber defined between the parts 52 and 53, and the secondary transducer 66 being housed within the chamber between the end wall 51 and the partition 53. The transducers will be substantially similar and will have diaphragms 56 and 49, respectively, shown as of substantially conical form, connected at their margins to one of the members 52 and 53. In the case of the diaphragm 56 of the transducer 65, the same will be associated with the wall 52 in such a manner as to close off from the main chamber of the housing 50 all of the openings 57 in the wall 52. Stated differently, the openings 57 will be so bunched and centered in the wall 52 and the diameter of the diaphragm 56 will be of such large size that none of the openings 57 are positioned outwardly of the diaphragm 56. At the apex of the diaphragm, it is connected by a rigid member or rod 58 to the central portion of a bendable piezoelectric element 59, such as a Rochelle salt crystal, a ceramic element or a quartz crystal, which is mounted at its opposite ends by means of supports 60 carried by the partition 53. The element 59 will be so located as to be substantially centered relative to the partition 53 and to be substantially parallel thereto.

The arrangement is the same in each of the transducers 65 and 66 except that the support 60 for the element 59 of the transducer 66 is carried by the end wall 51 of the housing and the diaphragm 49 of the secondary transducer is carried by the partition 53. The arrangement of the openings in the secondary transducer-mounting barrier or partition 53 and the number and location thereof will be such as to insure low impedance paths from front to back of the diaphragm 49 of the secondary transducer 66. For this purpose, openings in the partition 53 will be arranged to communicate with both the concave side of the diaphragm 49 and with the space around the diaphragm by location of said openings outwardly of the outline of the secondary diaphragm 49. The same arrangement, i. e., a non-shielded relation between the inner or back transducer and the inner surface of the diaphragm of the outer transducer, may be used in the Fig. 1 embodiment in at least some instances, and particularly when the pressure in the housing is small enough to avoid appreciable acoustic signal generation by the inner transducer.

The electrical connections for this microphone are shown as being series connections with lead 61 connecting the two elements 59 of the transducers 65 and 66, respectively, and the leads 62 and 63 extending from the two elements 59 and constituting the electrical output leads of the microphone which extend to and connect with the transformer and other electrical components conventionally employed in microphones.

It will be observed that this microphone construction provides for response of the transducer 65 to sound signals in the transmitting medium such as air, while shielding substantially completely the secondary transducer 66 from the same sound signals. The similarity of the mounting of the two transducer units 65 and 66 with respect to the casing, however, insures that their response to mechanical vibrations transmitted through the housing 50 will be substantially equal. Consequently, by proper electrical connection for electrical cancellation of outputs, any product of the transducers which results from mechanical vibration will be substantially electrically canceled, while the sound generated response of the primary transducer 65 will constitute the substantially total product or output of the microphone. Substantially the same characteristics of identity of transducers with respect to mass, compliance, resistance, and other properties, are desirable for economical production of maximum effectiveness of results. Inequalities of this construction in these particulars, and particularly, differences in sensitivity, may, however, be compensated electrically as explained previously.

Figure 6:
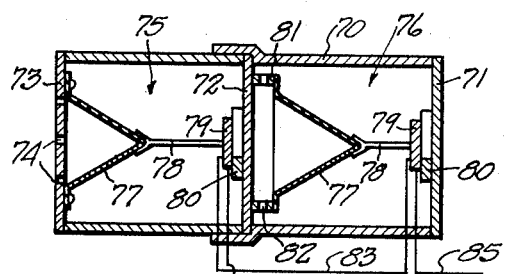
Fig. 6 is another embodiment of the invention utilizing transducers of the piezoelectric type but different from those shown in Fig. 5.

Another embodiment of the invention is illustrated in Fig. 6 applied to a crystal or piezoelectric type of microphone or transducer in which a twisting of the sensitive element produces an electrical signal. In this construction a housing 70 has a substantially tubular outer portion, an imperforate end 71, a substantially imperforate intermediate transverse partition 72 and a second end wall 73 provided with a series of perforations 74 adjacent the center thereof. As shown, the microphone or transducer housing in this instance is formed in two parts with the partition 72 being mounted between tthe two parts, but this construction is illustrative and is not intended to be limiting. The primary transducer 75 is mounted in the housing between the end wall 73 and the partition 72, and a secondary transducer 76 is mounted in the housing between the partition 72 and the end wall 71. The two transducers are substantially similar.

As shown, each transducer has a substantially conical diaphragm 77 whose apex is connected by means of a substantially rigid rod 78 with one end of a piezoelectric member 79 mounted upon a carrier member 80 of substantially L shape. The rod 78 is connected to the piezoelectric member 79 at a part thereof which is spaced from portions which engage the part 80, and consequently the ceramic may be bent or twisted for the purpose of generating electrical impulses therein. Any type of piezoelectric element, such as a Rochelle salt crystal, a ceramic element, a quartz crystal, or the like, which will respond to a twisting action and produce the generation of electrical current in response to the twisting action, may be employed. The diaphragm 77 of the primary transducer 75 is so positioned that all of the openings 74 in the wall 73 lead into communication with the cavity or concave surface of that diaphragm. The central partition 72 is substantially imperforate in this case and mounts a ring or annulus 81 within the chamber housing transducer 76 and formed of non-ferro-magnetic material. The margin of the diaphragm 77 of the secondary transducer 76 is anchored to the free edge of this annulus 81. A plurality of apertures 82 are formed in the annulus to provide low impedance paths from front to back of the diaphragm 77 of the secondary transducer 76.

The electrical connections in this microphone preferably include the provision of a lead 83 connecting the crystals 79 of the two transducers and the use of leads 84 and 85 extending to the transformer or other electrical component of the transducer or microphone and constituting the output leads of the device. It will be observed that complete isolation of the secondary transducer 76 is produced in this instance insofar as complete sealing thereof within a chamber defined by the housing with its imperforate tubular walls, end wall 71 and partition 72 is concerned. This sealing insures complete freedom of the secondary transducer 76 from response to sound signals in the air or other sound-transmitting medium.

Such isolation is not required, however, and experience has shown that isolation of the secondary transducer is adequate if it is merely sealed inside of the microphone cavity. In the latter connection the microphone can provide a better response because of the larger effective volume behind its diaphragm. In a stiffness controlled transducer as shown in Figs. 5 and 6, an inadequate volume behind the diaphragm of the front transducer reduces response at all frequencies, and in a resistance controlled transducer, such as a unit similar to Fig. 1 except that apertures 30 and 31 are omitted, an inadequate volume behind the diaphragm of the outer transducer will reduce the bass response of the transducer. In this connection, the volume provided in the embodiment shown in Fig. 5 is large because of the apertures 54 in the barrier 53 which are located externally of the diaphragm 49 of the secondary transducer 56. Obviously, it is important that the openings 54 shall be of low impedance in order that the desired properties and action of the device for maximum response of the sound sensitive transducer be secured.

In all other particulars the principle of operation and response of the microphone or transducer shown in Fig. 6 is substantially the same as that in the embodiments of the invention previously described. Also it will be apparent that the same essential characteristics are critical and important in both microphones, and particularly that the primary transducer must respond both to sound signals and to mechanically produced vibrations, whereas the secondary transducer must respond only to mechanical vibrations.

Figure 7:
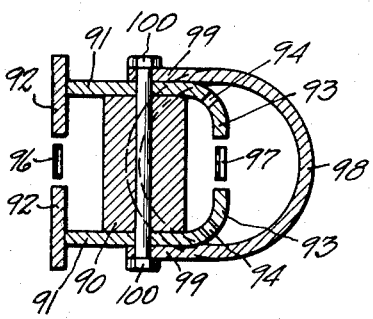
Fig. 7 is a transverse sectional view taken on line 7—7 of Fig. 8 and illustrating another embodiment of the invention having a transducer of the ribbon type.
Figure 8:
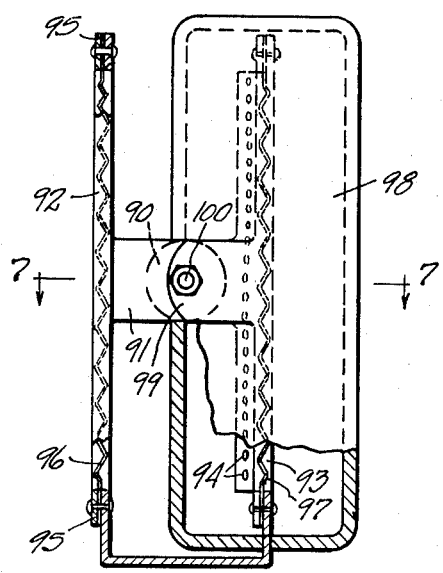
Fig. 8 is a side view of the device shown in Fig. 7 with parts thereof broken away and illustrated in section.
Figure 9:
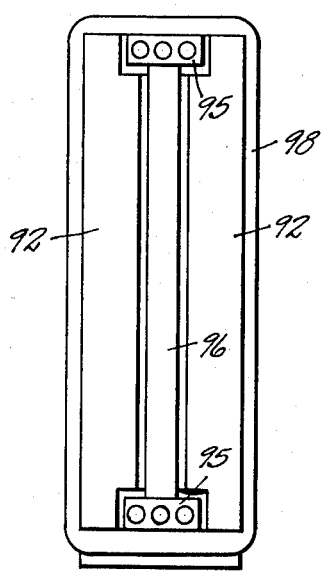
Fig. 9 is a front view of a microphone of the embodiment illustrated in Figs. 7 and 8.

An embodiment of the invention as applied to a microphone of the ribbon type is shown in Figs. 7, 8 and 9. In this embodiment of the invention a permanent magnet member 90 has a magnetic iron frame associated therewith and including opposed side portions 91, each carrying an elongated substantially upright portion 92 at one end thereof, and a second elongated upright magnetic portion 93 having a plurality of apertures 94 therein. Elongated gaps are provided between magnetic iron elongated portions 92, and these magnetic portions are spanned at their opposite ends by non-magnetic members or insulation members 95 which serve as means to anchor or support the opposite ends of a conventional ribbon element 96. A similar arrangement between the magnetic iron elongated members 93 serves to mount a second ribbon element 97. It will be understood that the elongated members 92 and 93 are substantially parallel to each other and of substantially the same length and other similar properties, with the exception of the provision of the apertures 94 in the parts 93, whereas the parts 92 are preferably not apertures. An enclosure formed of non-magnetic material and identified by the numeral 98 fits around the parts 93 and the ribbon 97 thereof and is preferably provided with flanges 99 providing means to anchor it by the securing members 100 to the frame of the microphone, preferably adjacent the magnet 90.

In this construction the enclosure 98 serves to isolate the ribbon 97 from sound signals in the air or other gaseous medium surrounding the unit, but provides substantially the same response of the ribbon 97 to shock or impact acting against the housing or frame of the unit as occurs with respect to the primary ribbon 96. By reason of this arrangement the primary ribbon element 96 is responsive to both sound signals and to shock signals, whereas the ribbon 97 is responsive only to shock signals. The characteristics of mass, compliance and resistance of the two transducer units will preferably be similar as in the preceding embodiments and, consequently, by electrical connection of the two transducer elements in phase opposition, it is possible to produce an output which is representative only of the sound signal and from which has been substantially completely excluded all signals resulting from shock, impact or jarring of the transducer. In this embodiment the openings 94 are located within the enclosure 98 and are of such size, arrangement and numbers as to provide low impedance paths from front to back of the ribbon 97.

While the preferred embodiments of the invention have been illustrated and described herein, it will be understood that such embodiments are to be considered illustrative only and are not intended to be limiting or all embracing, and it is further understood that other constructions falling within the scope of the appended claims are contemplated to fall within the spirit of this invention.

I claim:

1. A microphone comprising a support, a transducer carried by said support and responsive to a sound signal and to vibrations of said support, a second transducer carried by said support and responsive to vibrations of said support, means for shielding said second transducer to render it substantially non-responsive to a sound signal, and means for connecting said transducers electrically and in opposition whereby the responses thereof to vibrations of said support are substantially cancelled.

2. A microphone as defined in claim 1, wherein said transducers are substantially identical and are arranged in juxtaposition to be responsive to substantially the same vibrations of said support.

3. A microphone as defined in claim 1, wherein a shield substantially isolates said second transducer from sound signals.

4. A microphone comprising a housing, a transducer carried by said housing and responsive to sound signals and to vibrations of said housing, and a second transducer mounted in said housing adjacent said first transducer to be sensitive to vibrations of said housing, means shielding said second transducer to render it substantially insensitive to sound signals, said transducers having electrical output leads connected in opposite phasing and producing substantially equal electrical responses to vibration of said housing.

5. A microphone as defined in claim 1, and electrical means for counterbalancing the electrical outputs of said transducers.

6. A microphone comprising a support, a pair of transducers carried by said support and having substantially equal responses to vibration of said support, one transducer being responsive to sound signals, means imposing an acoustical impedance on the other transducer to render it substantially insensitive to sound signals, a transformer having a primary coil and means connecting said transducers electrically and in phase opposition to said transformer.

7. A microphone as defined in claim 6, wherein said transducers have substantially equal resonant frequencies.

8. A microphone as defined in claim 6, wherein said transducers have substantially equal quotients of mass divided by mechanical resistance.

9. A microphone as defined in claim 6, and a voltage divider connecting and substantially equalizing the outputs of said transducers.

10. A microphone as defined in claim 4, wherein said transducers are substantially matched, and a variable electrical resistance connected to the output terminals of said transducers.

11. A microphone as defined in claim 6, wherein said transducers have substantially equal properties of mass, compliance and mechanical resistance.

References Cited in the file of this patent

UNITED STATES PATENTS

| | | |
|---|---|---|
| 2,002,919 | Miessner | May 28, 1935 |
| 2,350,010 | Beckley | May 30, 1944 |
| 2,393,318 | Fraser | Jan. 22, 1946 |
| 2,437,088 | Giannini | Mar. 2, 1948 |
| 2,611,035 | Duncan | Sept. 16, 1952 |